Figure 1:
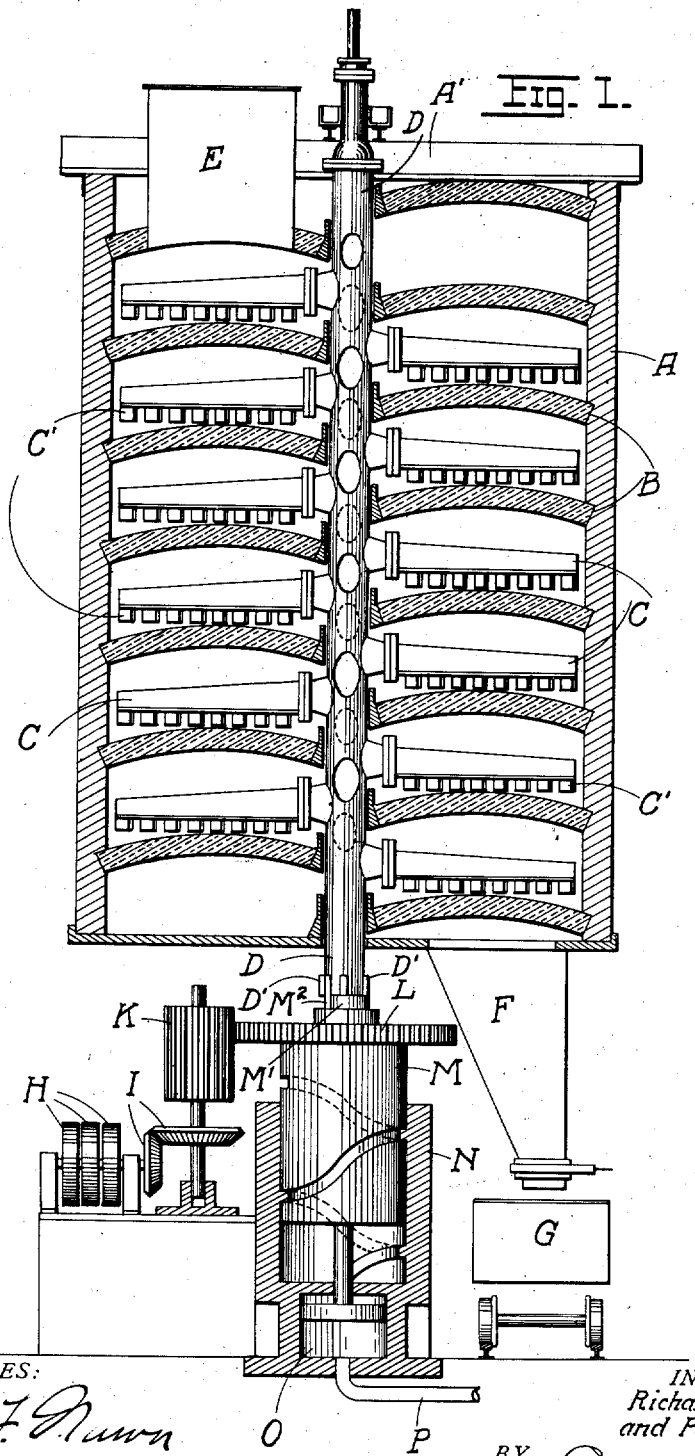

No. 12,511. REISSUED JULY 24, 1906.

R. L. LLOYD & P. THILL.

METALLURGICAL FURNACE.

APPLICATION FILED APR. 19, 1906.

3 SHEETS—SHEET 1.

WITNESSES:

Phil J. Nunn

Chas Shuman

INVENTORS

Richard L. Lloyd and Peter Thill

BY

Emil Starck

ATTORNEY.

No. 12,511. REISSUED JULY 24, 1906.

R. L. LLOYD & P. THILL.

METALLURGICAL FURNACE.

APPLICATION FILED APR. 19, 1906.

3 SHEETS—SHEET 2.

WITNESSES:

Phil J. Mann

Chas Shuman

INVENTORS

Richard L. Lloyd and Peter Thill

BY

Emil Starck

ATTORNEY.

No. 12,511. REISSUED JULY 24, 1906.

R. L. LLOYD & P. THILL.

METALLURGICAL FURNACE.

APPLICATION FILED APR. 19, 1906.

3 SHEETS—SHEET 3.

WITNESSES:

Chas Shuman

INVENTORS
Richard L. Lloyd
and Peter Thill

BY Emil Starck

ATTORNEY.

UNITED STATES PATENT OFFICE.

RICHARD L. LLOYD AND PETER THILL, OF GREAT FALLS, MONTANA.

METALLURGICAL FURNACE.

No. 12,511. Specification of Reissued Letters Patent. Reissued July 24, 1906.

Original No. 781,834, dated February 7, 1905. Application for reissue filed April 19, 1906. *Serial No. 312,696.

*To all whom it may concern:*

Be it known that we, RICHARD L. LLOYD and PETER THILL, citizens of the United States, and residents of Great Falls, in the county of Cascade and State of Montana, have invented certain new and useful Improvements in Metallurgical Furnaces, of which the following is a specification.

Our invention relates to that class of furnaces adapted for the manufacture of sulfuric acid from pyritic ores, and it is particularly adapted to those furnaces which work without other fuel than the heat generated by the oxidation of the ore. A furnace of this general type (though, of course, not embracing our improvements) is the well-known "McDougall," such as is described in Lunge's *Sulfuric Acid and Alkali*, second edition, page 260. The invention is not confined to furnaces thus employed, but can be used in drying ores, subjecting ores to chemical action of substances mixed with them, to chemical action of gases, with or without action of heat, and various other metallurgical, chemical, or industrial purposes.

In ore-roasting furnaces of the general type named a number of objections have been met with, which we aim by our invention to overcome. All of these furnaces with which we are familiar have a number of successive hearths, from one to the other of which the material is dropped in the process of roasting. The great objection to this is that it makes an excessive quantity of flue-dust, which not only impairs the success of the operation, but is difficult to handle. The greater part of the dust is made by dropping the material from one hearth to another. To overcome this objection, we provide a helical continuous hearth, making as many turns as may be desired to give the surface required for the proper roasting of the material passing through the furnace. To effect the continuous progression of the finely-divided ore, we arrange in each of the spaces between the turns of the helix stirrer-arms, which may be of ordinary or well-known construction, there being no essential novelty in these, many forms being in use in various furnaces. They may be cooled in any desired manner by means well known to engineers. It is manifest that the operation of arms (in the helical spaces indicated) by continuous or rotary motion is impossible. We therefore provide for a rotary reciprocation of the arms and arrange for their following the pitch of the helix in their downward movement (where the arms are, as illustrated in the present case, angularly placed ninety degrees apart) for a little more than half a revolution. At the end of their stroke they are first raised vertically a sufficient distance to clear the body of ore on the hearth and are then rotated backward, being depressed at the beginning of the stroke until they again engage the ore on the hearth. As thus constructed it is manifest that since the central shaft and stirrer-arms of a commercial furnace weigh several tons a considerable amount of power is required to operate the furnace.

A further feature of our invention therefore consists in means for diminishing this excessive power by the expedient of counterbalancing the rabble shaft and arms, so that as these are lowered the counterweight is raised. This may conveniently be done by a system of levers in furnaces of moderate or small capacity; but we find it more convenient, as well as more efficient, to support the mechanism upon hydraulic cylinders and connect the latter by pipes of sufficient capacity. Thus as one sinks the other rises and the amount of power required to operate the furnace will be, so far as the lifting is concerned, greatly reduced.

The accompanying drawings show a furnace constructed according to our invention.

Figure 2:
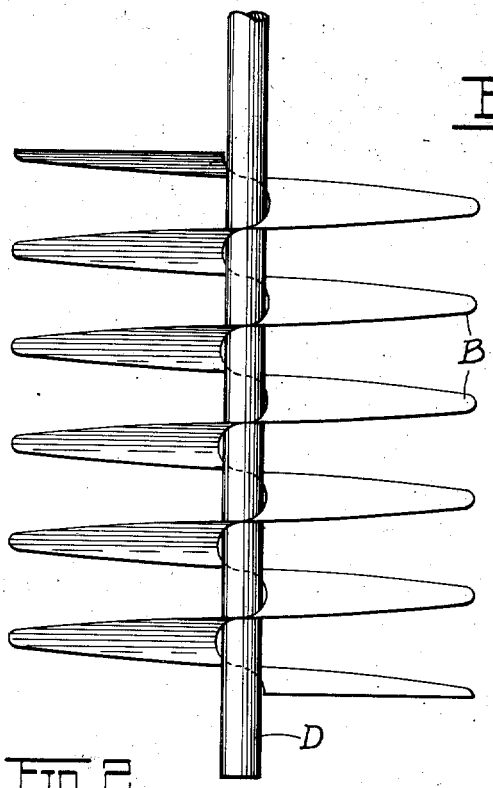
Figure 3:
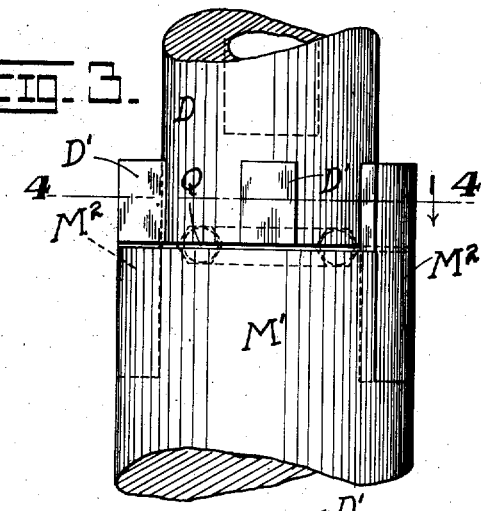
Figure 4:
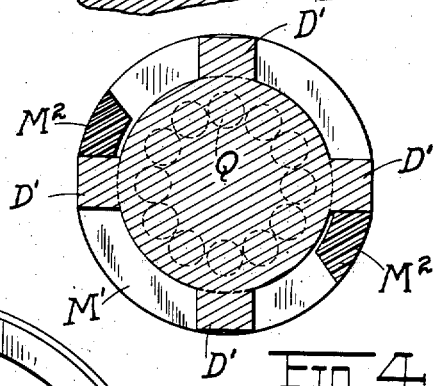
Figure 5:
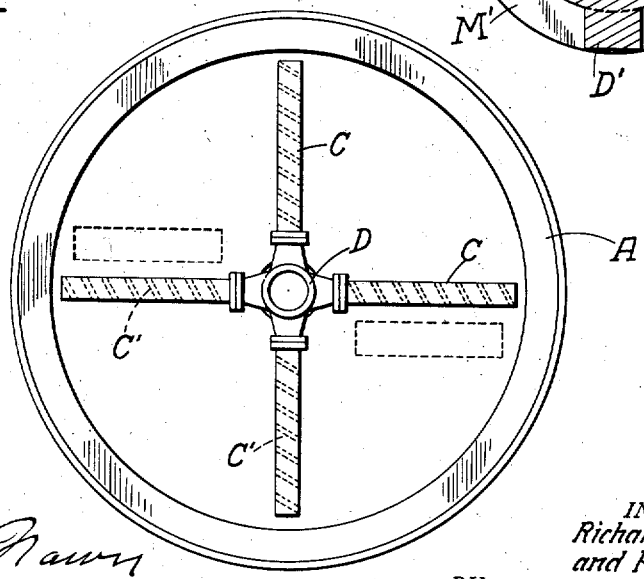

In the drawings, Figure 1 is a vertical section through such a furnace as we have described. Fig. 2 is a detailed diagram showing the outline of the hearth separate from the furnace. Figs. 3 and 4 are details of the driving mechanism, Fig. 4 being a horizontal section on line 4 4 of Fig. 3. Fig. 5 is a plan view with the top removed of the parts shown in Fig. 1, and Fig. 6 is a diagrammatic view of the counterbalancing mechanism.

In Fig. 1, A is the wall of the furnace, and B is the continuous helical shelf or hearth to which we have referred. Its particular conformation is indicated in diagram in Fig. 2. C C are the rabble-arms, often called "stirrers," being carried by the central rotary reciprocating rabble-shaft D. These arms are provided with rakes, rabbles, or blades C′. In practice we find it desirable to turn these blades in opposite directions on successive arms, so that one set, for example, moves the ore radially outward as well as forward on the hearth, and the next set on the succeeding or adjacent arm moves it radially inward toward the center as well as forward on the hearth, making the radial movement of the ore *nil*, the resulting travel of the ore being only forward and downward in the general direction of the length of the helical hearth. This rabbling or stirring exposes all of the ore thoroughly to the oxidizing action of the draft. In order to insure the ore-rabbling mechanism positively carrying the ore during one rotary stroke thereof over the entire space from one arm to the next arm below having its rakes or blades set in the same direction and that the radial movement of the ore in one direction produced by one arm may be neutralized by the radial movement in the opposite direction produced by the next adjacent arm, the rotation of the central rabble-shaft must amount to a little more than twice the angle subtended between two adjacent arms. This permits each segment of the hearth area confined between two adjacent arms at the beginning of a stroke to be raked by two arms, thereby producing an effective advance of the ore along the furnace-hearth. For example, where the arms are set ninety degrees apart the shaft in its rotary reciprocation would be rotated through an angle slightly in excess of one hundred and eighty degrees, where the arms are set one hundred and twenty degrees apart the shaft would be rotated through an angle of a trifle over two hundred and forty degrees, and where the arms are set one hundred and eighty degrees apart the shaft would be given a trifle over a complete rotation. It is apparent that the necessity for the respective degrees of rotation imparted to the rabble-shaft under the conditions recited results from the angular disposition of the blades on the successive rabble-arms, the blades on one arm being set at an angle (to the axis of the arm) opposite to that of the blades on an adjacent arm, this relation subsisting throughout the entire series of arms. The rabble-arms themselves of course are disposed about the central shaft on a helical line following the helical path of the furnace-hearth, the blades on the arms operating directly over the hearth on the material or ore to be rabbled. A′ represents the cover of the furnace, and E the feed-hopper from which the pyritic (or other) ore is supplied. F is the receiving-chute at the bottom of the furnace, from which the car G is filled in the usual way. At the lower part of Fig. 1 is shown the means for imparting rotary reciprocation to the rabble-arms, (and shaft.) The pulleys H H are operated in the usual way by cross-belts, (not shown,) one driving the gears I I in one direction and the other in the opposite direction. The driving-pinion K is of such length that the main driving-gear L must be moved up and down without losing mesh. This gear is fast with the threaded drum M, which rotates in a nut N. O is a hydraulic cylinder to which water is supplied by the pipe P.

Figs. 3 and 4 show the details of the arrangement by which the rabble-arms are reciprocated so as not to disturb the ore on the backward stroke. These figures are to be read in connection with Fig. 1. M′ is a projection from the drum M, which acts as a step for the shaft D. A ball-bearing Q is provided so that the shaft will remain stationary while the drum M revolves. Lugs D′ are formed upon the shaft D, and between these lugs projections or lugs $M^2$ $M^2$ from the step M′ may play. It is manifest that the shaft D will remain stationary as long as the lugs $M^2$ are disengaged from the lugs D′; but the moment said lugs $M^2$ encounter in their rotation the lugs D′ of the shaft the latter will necessarily be rotated in unison with the drum M. By this arrangement when the rabble-arms are at the end of their forward stroke and the belt is shifted from one to the other of the pulleys H H the drum M reverses its rotation and begins to rise upon the thread, carrying the shaft vertically with it. The shaft D does not then rotate, inasmuch as the lugs $M^2$ are moving away from one set of lugs D′ toward the other set. When the two sets of lugs $M^2$ D′ become engaged, however, the shaft, which has been raised sufficiently for the rabble or stirrer arms to clear the ore, rotates with the drum to the end of its backward stroke, being raised still further with the drums' rotation, and thereupon the belt is again shifted by any usual contrivance well known in the art. The lugs $M^2$ then rotate in the opposite direction away from their engaging lugs D′, the shaft and its arms are lowered into the ore, and upon the reëngagement of the lugs $M^2$ with the opposite set D′ the shaft is given its forward stroke or reciprocation in the opposite direction, being simultaneously further depressed with the drum, the rabble-arms in their rotary reciprocations following the pitch of the helix of the hearth. At the end of this stroke the belts are again shifted and the operation is repeated. The stirring or rabble mechanism thus outlined is new with us, and we desire to claim it whether used with a furnace of our particular construction or otherwise. It is, we believe, new to impart a rotary reciprocating motion to the rabble mechanism in the manner above outlined, and it is manifest that this has great advantages in procuring a steady and continuous advance of the ore through the furnace without the danger of breaking or interrupting the motion of the rabble mechanism during its backward stroke.

Figure 6:
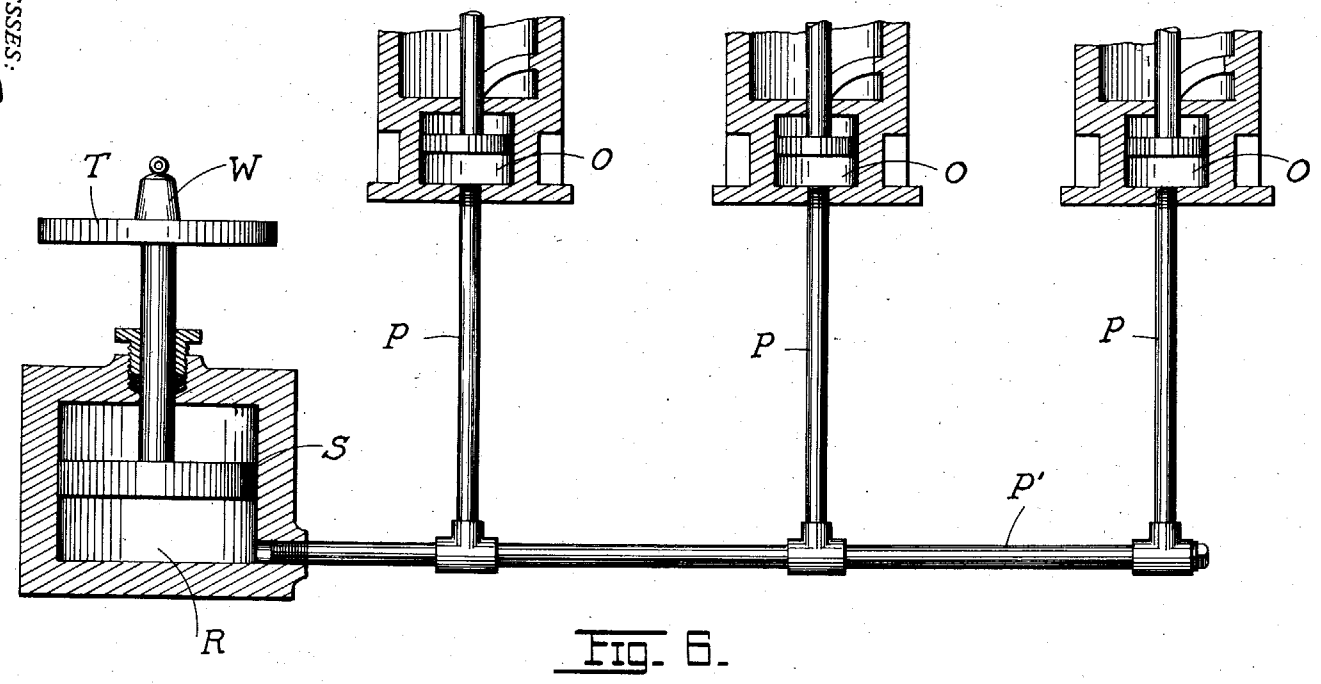

Fig. 6 shows how we may balance the rabble apparatus of the furnaces one against another. In this figure, O O are hydraulic cylinders of the several furnaces, the rest of the apparatus not being illustrated, as it is unnecessary for our purpose. P P are the pipes from the various hydraulic cylinders, connecting with a common header P'. This communicates with a cylinder R, the contents of which may be equal to that of the cylinders O or somewhat greater. The piston S reciprocates in this cylinder, carrying the table T, on which a weight W may be disposed sufficient to balance the various furnaces. By this means each of the furnaces has independent motion, and the weight of the moving parts is efficaciously counterbalanced.

Having described our invention, what we claim is—

1. In a furnace, a stationary longitudinally-curved hearth, in combination with rabble mechanism disposed in the space between the turns of the hearth.

2. In a furnace, a stationary helical hearth, combined with rabble mechanism disposed in the space between the turns of the helix.

3. In a furnace, the combination of a hearth forming a continuous longitudinally-curved path for the ore, extending from the feed to the discharge end of the furnace, and disposed about a vertical axis, reciprocating rabble mechanism, means for causing it to follow the curve of the hearth during the raking of the ore, and means for withdrawing it from contact with the ore on its backward stroke.

4. In a furnace, the combination with a helical hearth, of rabble-arms, and means for imparting to them a rotary reciprocation following the pitch of the helix.

5. In a furnace, the combination with a helical hearth, of rabble-arms, means for imparting to them a rotary reciprocation following the pitch of the helix, means for raising them above the ore on their backward stroke, and means for lowering them into engagement with the ore on their forward stroke.

6. In a furnace, the combination with a helical hearth having a substantially vertical axis, of rabble-arms and means for imparting to them a rotary reciprocation in contact with the ore during their downward or forward stroke, and out of contact therewith during their backward or upward stroke.

7. In a furnace, the combination with a helical hearth, of a shaft carrying rabble-arms, means for imparting rotary reciprocation to the shaft and arms, a guide for causing the motion to follow the pitch of the helix, and means for raising the shaft at the end of its stroke so that the backward movement of the arms is out of effective contact with the ore.

8. The combination with a plurality of furnaces provided with rabble mechanism having a central shaft and rabble-arms with some vertical movement, of means for counterbalancing the weight of the rabble mechanism.

9. The combination with the rabble mechanism of a furnace, having a central shaft and rabble-arms with some vertical movement, of means for counterbalancing its weight.

10. The combination with a furnace rabble mechanism consisting of a central shaft with rabble-arms, having a limited vertical movement, of a hydraulic cylinder and piston supporting the rabble mechanism, and means for counterbalancing the thrust on the piston.

11. In a furnace, a rabble mechanism comprising a central shaft with radial rabble-arms, and means for imparting to the shaft a rotary reciprocation through an angle approximately twice that subtended between two adjacent arms.

12. In a furnace, the combination of a helical hearth with a rabble mechanism comprising a central shaft having radial arms, and means for imparting to the shaft a rotary reciprocation over approximately twice the angle subtended between two adjacent arms.

13. In a furnace, a rabble mechanism consisting of a central shaft with radially-disposed rabble-arms, means for imparting to the shaft a rotary reciprocation over approximately twice the angle subtended between two adjacent arms, and means for removing the latter from effective contact with the ore during their backward movement.

14. In a furnace, the combination of a helical hearth with a rabble mechanism comprising a central shaft having radial arms, means for imparting to the shaft a rotary reciprocation of approximately twice the angle subtended between two adjacent arms, and means for removing the rabbles from effective contact with the ore during their backward stroke.

15. The combination, with a number of furnace rabble mechanisms having vertical movement, of a common counterbalance for all the mechanisms.

16. The combination with a number of furnace rabble mechanisms supported each by a hydraulic cylinder and piston, of a main hydraulic cylinder, pipes connecting all of the cylinders, and a weighted piston in the main cylinder.

17. In a furnace, a rabble-shaft having a series of rabble-arms distributed thereon on a helical line disposed about the axis of the shaft, and blades on the arms disposed at an angle to the axes of the arms, the blades on one arm being turned opposite to those on an adjacent arm.

18. In combination with a furnace having a longitudinally-curved hearth, a rabble-shaft having a series of rabble-arms disposed thereon in the path of the curvature of the hearth.

19. In combination with a furnace having a helical hearth, a rabble-shaft having a series of rabble-arms disposed thereon in the path of the helix of the hearth, and blades on the arms disposed at an angle to the axes of the arms, the blades on one arm being set at an angle opposite to that of the blades on an adjacent arm throughout the series of arms.

20. In combination with a furnace having a longitudinally-curved hearth, a rabble-shaft having a series of rabble-arms disposed thereon in the path of the curvature of the hearth, and means for imparting a vertical reciprocating movement to the shaft and arms, and a simultaneous rotary reciprocation.

21. In combination with a furnace having a helical hearth, a series of rabble-arms having a rotary reciprocation over the hearth, and blades on the arms disposed at an angle to the axes of the arms, the blades on one arm being set at an angle opposite to that of those on an adjacent arm throughout the series of arms.

22. In combination with a furnace having a helical hearth, a series of rabble-arms disposed above the hearth, and means for imparting thereto a reciprocating movement both vertically and horizontally to follow the pitch of the helix.

23. In a furnace, a rabble mechanism comprising a central shaft with radial rabble-arms, and means for imparting to the shaft and arms a rotary reciprocation through an angle approximately twice that subtended between two adjacent arms, and also a simultaneous vertical reciprocation.

24. In a furnace, a rabble mechanism capable of conjoint vertical and rotary reciprocating movement.

25. In a furnace, a rabble mechanism comprising a central shaft with radial rabble-arms, and means for periodically imparting thereto a rotation through an angle approximately twice that subtended between two adjacent arms.

26. In combination with a furnace having a longitudinally-curved hearth, a rabble-shaft having a series of rabble-arms disposed thereon in the path of the curvature of the hearth, and means for imparting a vertical movement to the shaft and arms, and a simultaneous rotary movement.

27. In a furnace, a rabble mechanism capable of conjoint vertical and rotary movement.

28. In combination with a furnace having a helical hearth, a series of rabble-arms disposed above the hearth, and means for imparting thereto a movement both vertically and horizontally to follow the pitch of the helix.

29. In a furnace, the combination with a helical hearth, of rabble-arms, and means for imparting to them a rotary movement following the pitch of the helix.

In testimony whereof we affix our signatures each in the presence of two witnesses.

RICHARD L. LLOYD.
PETER THILL.

Witnesses for Richard L. Lloyd:
E. M. CARPENTER.
G. D. CALHOUN.

Witnesses for Peter Thill:
WM. B. MCGINNIS,
THOMAS E. SWIFT.